(12) United States Patent
Asada et al.

(10) Patent No.: US 6,657,674 B1
(45) Date of Patent: Dec. 2, 2003

(54) IMAGE PICKUP APPARATUS

(75) Inventors: Ryoji Asada, Hirakata (JP); Shoji Nishikawa, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/285,042

(22) Filed: Apr. 1, 1999

(30) Foreign Application Priority Data

Apr. 2, 1998 (JP) .......................................... 10-089914

(51) Int. Cl.[7] ................................................ H04N 7/01
(52) U.S. Cl. ..................................... 348/446; 348/222.1
(58) Field of Search ........................... 348/222.1, 229.1, 348/230.1, 231.99, 305, 295, 206, 302, 312, 443, 446; 358/474, 482, 483

(56) References Cited

U.S. PATENT DOCUMENTS

| | | | | |
|---|---|---|---|---|
| 5,321,509 A | * | 6/1994 | Kannegundla | 348/222.1 |
| 6,259,478 B1 | * | 7/2001 | Hori | 348/296 |
| 6,342,921 B1 | * | 1/2002 | Yamaguchi et al. | 348/322 |
| 6,377,301 B1 | * | 4/2002 | Hieda | 348/222.1 |
| 6,538,696 B2 | * | 3/2003 | Hieda et al. | 348/317 |

FOREIGN PATENT DOCUMENTS

JP          10191129          7/1998

* cited by examiner

Primary Examiner—Wendy R. Garber
Assistant Examiner—Jacqueline Wilson
(74) Attorney, Agent, or Firm—McDermott, Will & Emery

(57) ABSTRACT

An image pickup apparatus operated in mode-1 in which signal-charge that is charged in a CCD imaging device is read out as the output signal of the CCD imaging device once in each field of progressive-scanning, or in mode-2 in which the signal-charge is read out once (viz. during one field) in every two fields of progressive-scanning. And the output signal of the CCD imaging device is written into a memory according to a progressive-scanning synchronizing signal during the intervals when the signal-charge is read out. Then the signal written in the memory is read out, in the mode-1, according to the progressive-scanning synchronizing signal, and, in the mode-2, in such a manner that odd lines are read out in each odd field and even lines are read out in each even field according to an interlaced-scanning synchronizing signal. The above structure enables the image pickup apparatus to have simple circuit, good performance, and to be usable for at least the two modes of the 525/60P mode and the 525/30P mode.

8 Claims, 11 Drawing Sheets

IMAGE PICKUP APPARATUS

FIELD OF THE INVENTION

The present invention relates to an image pickup apparatus for producing a video signal from an optical image by driving a solid imaging device and by performing video-signal processing, according to a plurality of scanning systems including a progressive-scanning system.

BACKGROUND OF THE INVENTION

A conventional image pickup apparatus of progressive-scanning type has structure, for example, as shown by the block diagram of FIG. 11. The conventional image pickup apparatus of FIG. 11 comprises a charge coupled device (CCD) imaging device 1 that is a solid imaging device of a progressive-scanning type, an imaging device driving circuit (hereinafter referred to as CCD driving circuit) 2 for driving the CCD imaging device 1, a preamplifier 3 for obtaining a good video signal in regard to signal-to-noise (SN) ratio from the output signal of the CCD imaging device 1, an analog-to-digital (A/D) converter 4 for converting the output signal of the amplifier 3 to a digital signal, a digital processing circuit 5a for providing various video-signal processing on the digital signal, a video tape recorder interface (VTR I/F) circuit 6 for converting the output signal of the digital processing circuit 5a to a signal that can be recorded by a VTR 7 that records a progressive-scanning signal, and a progressive-scanning synchronizing signal producing circuit 8 for supplying a progressive-scanning synchronizing signal, by which the output signals of all of the above composing members are synchronized.

The following is description on the operation of the conventional image pickup apparatus. The output signal of the CCD imaging device 1 is produced by performing progressive-scanning on the CCD imaging device 1 according to the progressive-scanning synchronizing signal. The low frequency noise that is included in the output signal of the CCD imaging device 1 is decreased by the preamplifier 3 comprising a correlated-double-sampling circuit. The output signal of the preamplifier 3 is converted to a digital signal by the A/D converter 4, and undergoes various video-signal processing such as gamma correction, enhancement, matrix processing, and the like in the digital processing circuit 5a. The output signal of the digital processing circuit 5a is converted by the VTR I/F circuit 6 to the signal that can be recorded by the VTR 7. In more detail, the VTR 7 records the progressive-scanning video signal of the studio standard of the 525/60P mode, which has 525 horizontal lines, 33.5 kHz horizontal frequency, and 59.94 Hz vertical frequency.

In the above structure, if the frequencies of the synchronizing signals supplied to all composing members including the CCD imaging device is changed to half, the progressive-scanning signal of the 525 horizontal lines, 15.75 kHz horizontal frequency and 29.97 Hz vertical frequency (hereinafter referred to as a 525/30P mode) can be obtained. An image pickup apparatus that is usable for the two modes of the 525/60P mode and the 525/30P mode can be thus obtained.

However, in the image pickup apparatus used for both 525/60P mode and 525/30P mode, the circuits of all composing members are to be operable for the two different modes, which result in extreme difficulty in optimizing the CCD imaging device 1 and the preamplifier 3. In more detail, the frequencies of two horizontal driving pulses having respectively different phases for reading out by transferring horizontally the signal-electric-charge (hereinafter referred to as signal-charge) that is charged in the CCD imaging device 1 and the frequency of the reset-pulse at the output portion of the CCD imaging device 1 are, in general, as high as 30–50 MHz in the 525/60P mode and 15–25 MHz in the 525/30P mode, though these frequencies are different depending on the number of pixels of the CCD imaging device 1. Therefore, it is extremely difficult to adjust optimally, for the two different modes, the phase positioning and the waveforms of the above three pulses, which are the factors of determining the performance such as sensitivity, frequency characteristics and the like of the CCD imaging device 1.

Also, the preamplifier 3 produces a good video signal in regard to SN ratio from the output signal of the CCD imaging device 1 by decreasing the low frequency noise of the output signal in such a manner that the output signal is sampled by using two pulses having respectively different phases, and the difference between the waveforms of the two signal samples, which is a noise component, is eliminated, in which, the phase positioning and the waveforms of the two pulses for the signal sampling are the factors of determining the degree of the improvement of the signal quality in regard to the SN ratio, as in the case of the above CCD driving pulses. In this case also, it is extremely difficult to adjust optimally the phase positioning and the waveforms of the two pulses for the above two different modes, which also makes the circuit complicated.

In addition, for decreasing the influence of the pulses for driving the CCD imaging device 1 and for signal sampling for noise reduction in the preamplifier 3, filters for intercepting these pulses are used in analog-processing of pre-processing before introducing the signal into the A/D converter 4. In this case also, since the filters for the above two different modes are needed, the circuit becomes complicated.

The present invention is to address the above problems, i.e., the present invention aims to provide an image pickup apparatus that has a simple circuit and good performance for the use in the two modes of the 525/60P mode and the 525/30P mode, or three modes including one more the 525i mode of interlaced-scanning.

SUMMARY OF THE INVENTION

An image pickup apparatus of the present invention, for realizing the above aim, comprises a signal-charge reading-control circuit for switching either to mode-1 in which one pulse is supplied in each vertical scanning interval (hereinafter referred to as a field) of progressive scanning, or to mode-2 in which one pulse is supplied in every two fields of progressive scanning, for reading out the signal-charge that is charged in a CCD imaging device as the output signal of the CCD imaging device, a writing-control circuit that works for writing, into a memory, the output signal of the CCD imaging device, during the intervals when the output signal is obtained by reading out the signal-charge that is charged in the CCD imaging device, and, a reading-control circuit that works for reading out, in the mode-1, the signal written in the memory according to a progressive-scanning synchronizing signal, and for reading out, in the mode-2, the signal written in the memory according to an interlaced-scanning synchronizing signal in such a manner that odd scanning lines (hereinafter referred to as "line" for "scanning line") are read out in each odd field and even lines are read out in each even field. The above structure enables the image pickup apparatus to have a simple circuit and good performance for the use in the two modes of the 525/60P mode and the 525/30P mode. More details are described hereinafter.

A first invention of the present invention is that the image pickup apparatus comprises a CCD imaging device, a progressive-scanning synchronizing signal producing circuit for supplying a progressive-scanning synchronizing signal, an interlaced-scanning synchronizing signal producing circuit for supplying an interlaced-scanning synchronizing signal having a vertical synchronizing signal of the frequency that is identical with the frequency of the vertical synchronizing signal of the progressive-scanning synchronizing signal, and a horizontal synchronizing signal of the frequency that is substantially the half of the frequency of the horizontal synchronizing signal of the progressive-scanning synchronizing signal, an imaging-device driving circuit for supplying a driving signal for performing scanning on the CCD imaging device according to the progressive-scanning synchronizing signal, a signal-charge reading-control circuit for switching either to mode-1 in which one reading pulse, which is included in the driving signal supplied by the imaging-device driving circuit, is supplied in each field of progressive-scanning, or to mode-2 in which one reading pulse is supplied in every two fields of progressive scanning, for reading out signal-charge that is charged in the CCD imaging device as the output signal of the CCD imaging device, a memory into which the output signal of the CCD imaging device is written, a writing-control circuit that works for writing, into the memory, the output signal of the CCD imaging device, during the intervals when the output signal is obtained by reading out the signal-charge that is charged in the CCD imaging device, and, a reading-control circuit that works for reading out, in the mode-1, the signal written in the memory according to the progressive-scanning synchronizing signal, and for reading out, in the mode-2, the signal written in the memory in such a manner that odd lines are read out in each odd field and even lines are read out in each even field according to the interlaced-scanning synchronizing signal.

From the above structure, in the mode-1, the signal of the 525/60P mode can be obtained according to the progressive-scanning synchronizing signal.

And, in the mode-2, the signal of the 525/30P mode, which is virtually identical with the signal of the 525i mode, can be obtained in such a manner that a field in which the signal-charge is read out, and another field in which the signal-charge is not read out are alternately repeated (the signal is a progressive-scanning signal obtained in every 1/30 second), then, the signal thus obtained from the CCD imaging device is written into the memory once in every two fields, i.e. the signal is written into the memory during the intervals when the output signal of the CCD imaging device is obtained by reading out the signal-charge that is charged in the CCD imaging device, then, the signal written in the memory is read out in such a manner that odd lines are read out in each odd field, and even lines are read out in each even field. From the above structure, an image pickup apparatus, which has a simple circuit, good performance, and is usable for the two modes of the 525/60P mode and the 525/30P mode can be obtained.

A second invention of the present invention is that a recording unit (hereinafter referred to as a VTR) that can record the signal of the 525/60P mode or the 525i mode is added to the above first invention. As a result, the VTR can record the signal of the 525/60P mode in the mode-1, or the signal of the 525/30P mode in the mode-2.

A third invention of the present invention is that a P/I (progressive/interlaced-scanning) converting circuit is added to the above first invention. The P/I converting circuit produces an interlaced-scanning signal of the 525i mode by adding two lines of the signal of the 525/60P mode, which is read out from the memory in the mode-1, alternately decimating the added lines, and expanding the time base of the signal comprising the added lines to double. The above structure realizes the image pickup apparatus that is usable for the three modes of the 525/60P mode, the 525/30P mode, and the 525i mode.

A fourth invention of the present invention is that the VTR that can record the signal of the 525/60P mode or the 525i mode is added to the above third invention. As a result, the VTR can record the signal of the 525/60P mode when the VTR is in the 525/60P mode, or, the signal of the 525/30P mode or the 525i mode when the VTR is in the 525i mode.

A fifth invention of the present invention is that the image pickup apparatus comprises a progressive-scanning synchronizing signal producing circuit for supplying a progressive-scanning synchronizing signal, an interlaced-scanning synchronizing signal producing circuit for supplying an interlaced-scanning synchronizing signal having the vertical synchronizing signal of the frequency that is identical with the frequency of the vertical synchronizing signal of the progressive-scanning synchronizing signal, and the horizontal synchronizing signal of the frequency that is substantially the half of the frequency of the horizontal synchronizing signal of the progressive-scanning synchronizing signal, a CCD imaging device that is composed in such a manner that scanning is performed on the CCD imaging device according to the progressive-scanning synchronizing signal, and that all odd lines are read out in the first half of each field and all even lines are read out in the latter half of each field, or all even lines are read out in the first half of each field and all odd lines are read out in the latter half of each field, an imaging-device driving circuit for supplying a driving signal that performs scanning on the CCD imaging device according to the progressive-scanning synchronizing signal, a signal-charge reading-control circuit for switching either to mode-1 in which one reading pulse, which is included in the driving signal, is supplied in each field of progressive scanning, or to mode-2 in which one reading pulse is supplied in every two fields of progressive scanning, for reading out the signal-charge that is charged in the CCD imaging device, a memory into which the output signal of the CCD imaging device is written, a writing-control circuit that works for writing, into the memory, the output signal of the CCD imaging device, during the intervals when the output signal is obtained by reading out the signal-charge that is charged in the CCD imaging device, and, a reading-control circuit that works for reading out the signal written in the memory according to the interlaced-scanning synchronizing signal in the form of two separate interlaced-scanning signals in the mode-1, or in the form of one interlaced-scanning signal in the mode-2.

From the above structure, the signal of the 525/60P mode comprising two separate signals can be produced by utilizing the two separate interlaced-scanning signals that are obtained in the mode-1, or, the signal of the 525/30i mode can be produced by utilizing one interlaced-scanning signal that is obtained the mode-2.

A sixth invention of the present invention is that the VTR is disposed in place of the digital output circuits in the above fifth invention. The VTR can record the signal of the 525/60P mode in the mode-1 by recording the two separate interlaced-scanning signals, or the signal of the 525/30i mode in the mode-2 by recording one interlaced-scanning signal. As a result, the VTR can record the signal of the 525/60P mode in the mode-1, or the signal of the 525/30P mode in the mode-2.

A seventh invention of the present invention is that a P/I converting circuit is added to the above fifth invention. The P/I converting circuit produces the signal of the 525i mode by adding two corresponding lines of the two separate interlaced-scanning signals that are read out from the memory in the mode-1. As a result, an image pickup apparatus that is usable for the three modes of the 525/60P mode, the 525/30P mode and the 525i mode can be obtained.

A eighth invention of the present invention is that the VTR that can record the signal of the 525/60P mode or the 525i mode is added to the above seventh invention. As a result, the VTR can record the signal of the 525/60P mode when the VTR is in the 525/60P mode, or, the signal of the 525/30P mode or the 525i mode when the VTR is in the 525i mode. In other words, the VTR records two interlaced-scanning signals in the mode-1, one interlaced-scanning signal in the mode-2, or the output signal of the P/I converting circuit.

DESCRIPTION OF THE PREFERRED EMBODIMENTS

First Exemplary Embodiment

Figure 1:
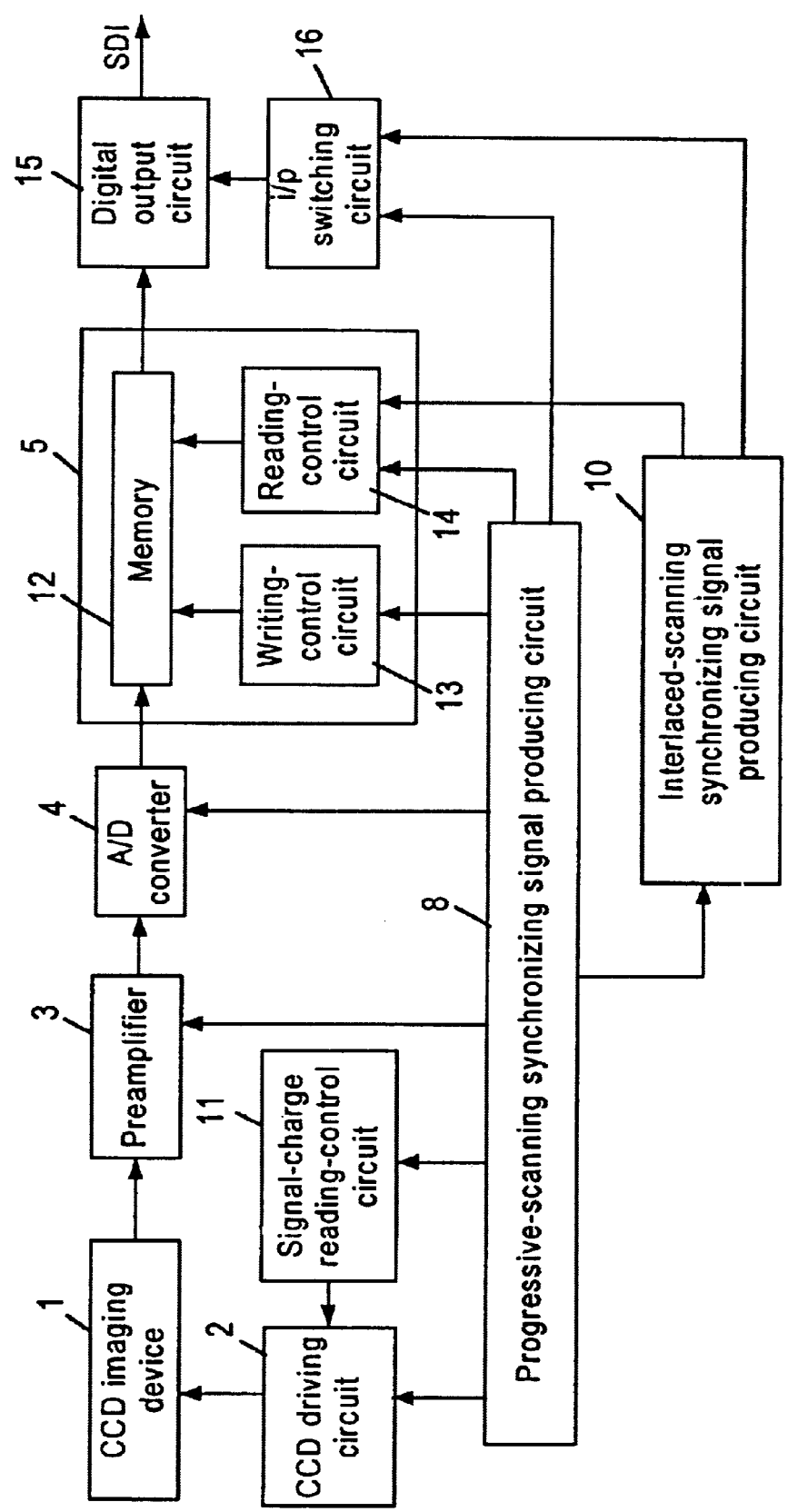
FIG. 1 is a block diagram showing the structure of an image pickup apparatus in a first exemplary embodiment of the present invention, FIG. 2-a through FIG. 2-i show waveforms for explanation on the first exemplary embodiment of the same.

FIG. 1 is a block diagram showing the structure of an image pickup apparatus in a first exemplary embodiment of the present invention. As shown in FIG. 1, the image pickup apparatus comprises a CCD imaging device (two-dimensional CCD light sensing device) 1 that is a solid imaging device, a CCD driving circuit 2 for driving the CCD imaging device 1, a preamplifier 3 for obtaining good video signal in regard to SN ratio from the output signal of the CCD imaging device 1, an A/D converter 4 for converting the output signal of the preamplifier 3 to a digital signal, a digital processing circuit unit 5 for video-signal processing such as gamma correction, enhancement, matrix processing and the like, a progressive-scanning synchronizing signal producing circuit 8 for supplying the progressive-scanning synchronizing signal of the 525/60P mode, an interlaced-scanning synchronizing signal producing circuit 10 for supplying the interlaced-scanning synchronizing signal of the 525i mode, which synchronizes with the progressive-scanning synchronizing signal of the 525/60P mode, a signal-charge reading-control circuit 11 for switching either to mode-1 in which one reading pulse is supplied in each field of progressive scanning (525/60P) for reading out signal-charge that is charged in the CCD imaging device as the output signal of the CCD imaging device, i.e., the signal-charge is read out in each field, or to mode-2 in which one reading pulse is supplied in every two fields of progressive scanning, i.e., the signal-charge is read out once (viz. during one field) in every two fields, a memory 12 into which a digital signal is written, a writing-control circuit 13 that works for writing the output signal of the CCD imaging device 1 into the memory 12 always in mode 1 and writing during the intervals when the output signal is obtained by reading out the signal-charge that is charged in the CCD imaging device 1 in mode 2, a reading-control circuit 14 that works for reading out, in the mode-1, the signal written in the memory 12 according to the progressive-scanning synchronizing signal of the 525/60P mode, and, for reading out, in the mode-2, the signal written in the memory, in such a manner that odd lines are read out in each odd field and even lines are read out in each even field according to the interlaced-scanning synchronizing signal of the 525i mode, a digital output circuit 15 for producing a signal for serial digital interface (hereinafter referred to as SDI) with an external video apparatus, and an i/p (interlaced/progressive-scanning) switching circuit 16 for supplying, to the digital output circuit 15, the progressive-scanning synchronizing signal of the 525/60P mode in the mode-1 or the interlaced-scanning synchronizing signal of the 525i mode in the mode-2.

Figure 2:
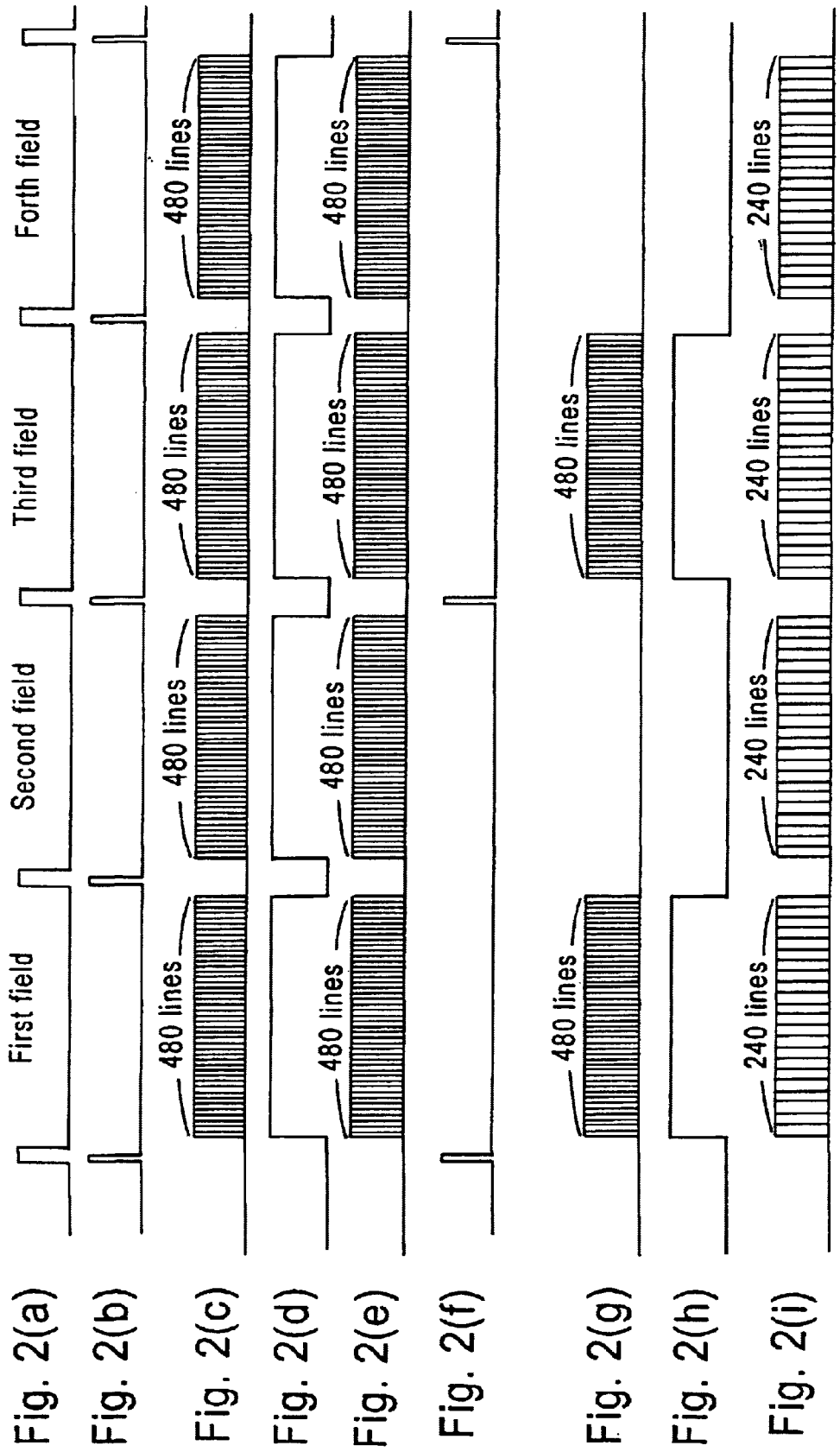

FIG. 2-a shows the waveform of the vertical synchronizing signal of the progressive-scanning synchronizing signal of the 525/60P mode and that of the interlaced-scanning synchronizing signal of the 525i mode, i.e., both vertical synchronizing signals have the identical frequency of FIG. 2-a. FIG. 2-b through FIG. 2-e show the waveforms in the mode-1 (525/60P). FIG. 2-b shows the waveform of a signal-charge reading pulse supplied from the CCD driving circuit 2 to the CCD imaging device 1 according to the controlling signal supplied by the signal-charge reading-control circuit 11, for reading out the signal charge that is charged in the CCD imaging device, in every field, as the output signal of the CCD imaging device. FIG. 2-c shows the waveform of the output signal that is read out newly in every field from the CCD imaging device 1. FIG. 2-d shows the waveform of a writing pulse supplied by the writing-control circuit 13. The output signal of the CCD imaging device 1 is written into the memory 12 during the intervals of the high level of the waveform of FIG. 2-d. FIG. 2-e shows the waveform of the output signal of the memory 12, which is read out according to the control of the reading-control circuit 14. The waveform shows that the signal written into the memory 12 is read out from the memory 12, i.e., both are identical.

FIG. 2-*f* through FIG. 2-*i* show the waveforms in the mode-2 (525/30P). FIG. 2-*f* shows the waveform of the signal-charge reading pulse supplied from the CCD driving circuit 2 to the CCD imaging device 1, according to the controlling signal supplied by the signal-charge reading-control circuit 11, for reading out the signal-charge that is charged in the CCD imaging device 1, once (viz., during one field) in every two fields, as the output signal of the CCD imaging device. FIG. 2-*g* is the waveform of the output signal of the CCD imaging device 1 showing that a new video signal is read out from the CCD imaging device 1 in each odd field, and no video signal is read out in each even field. FIG. 2-*h* shows the waveform of a writing pulse supplied by the writing-control circuit 13. The output signal of the CCD imaging device 1 is written into the memory 12 during the intervals of the high level of the writing pulse, which becomes high level in each odd field in which a video signal is read out from the CCD imaging device 1. FIG. 2-*i* is the waveform of the output signal of the memory 12, which shows that the signal written into the memory 12 is read out in such a manner that odd lines are read out in each odd field and even lines are read out in each even field, which is performed by the control of the reading-control circuit 14 according to the interlaced-scanning synchronizing signal of the 525i mode.

The operation of the image pickup apparatus is described hereinafter referring to FIG. 1 and FIG. 2-*a* through FIG. 2-*i*.

First, the case of the mode-1 is described hereinafter. The progressive-scanning synchronizing signal producing circuit 8 supplies a progressive-scanning synchronizing signal of the 525/60P mode, based on which the following operation is performed. The signal-charge that is charged in the CCD imaging device 1 is read out in every field as shown by FIG. 2-*c* as the output signal of the CCD imaging device 1. The reading of the signal-charge is performed by the signal-charge reading pulse of FIG. 2-*b*, which is supplied from the CCD driving circuit 2 to the CCD imaging device 1 according to the controlling signal of the signal-charge reading-control circuit 11. Then the output signal of the CCD imaging device 1 is introduced into the preamplifier 3 for decreasing the low frequency noise of the signal by the correlated-double-sampling circuit of the preamplifier 3. Then the signal is converted to a digital signal by the A/D converter 4, and introduced into the digital processing circuit unit 5 for undergoing the video-signal processing. In the digital processing circuit unit 5, a writing-pulse as shown by FIG. 2-*d* is supplied by the writing-control circuit 13, by which the output signal of the CCD imaging device 1 is written into the memory 12, during the intervals when the writing-pulse of FIG. 2-*d* is at high level.

The signal written into the memory 12 is read out as the output signal of the memory 12 according to the control of the reading-control circuit 14. The output signal of the memory 12 has the waveform of FIG. 2-*e*, which shows that the signal written into the memory 12 is read out from the memory 12, i.e. both are identical. Then the signal is introduced into the digital output circuit 15 which produces an SDI signal for SDI with an external video apparatus from the output signal of the digital processing unit 5, according to the progressive-scanning synchronizing signal of the 525/60P mode supplied through the i/p switching circuit 16.

Next, the case of the mode-2 is described hereinafter. In the mode-2 also, the progressive-scanning synchronizing signal producing circuit 8 supplies a progressive-scanning synchronizing signal of the 525/60P mode, based on which the following operation is performed. The signal-charge reading pulse shown by FIG. 2-*f* is supplied from the CCD driving circuit 2 to the CCD imaging device 1 according to the control of the signal-charge reading-control circuit 11 once in every two fields. As a result, the signal-charge that is charged in the CCD imaging device 1 is read out, according to the signal-charge reading pulse of FIG. 2-*f*, once (viz., during one field) in every two fields, as shown by FIG. 2-*g*, as the output signal of the CCD imaging device 1. Then the signal is introduced into the preamplifier 3.

In the digital processing unit 5, a writing-pulse shown by FIG. 2-*h* is supplied by the writing-control circuit 13 in each odd field, in which the signal-charge that is charged in the CCD imaging device 1 is read out, and the signal received through the preamplifier 3 is written into the memory 12 in each odd field according to the writing-pulse. The reading-control circuit 14 works for reading out the signal written in the memory 12 in such a manner that odd lines are read out in each odd field and even lines are read out in each even field as shown by FIG. 2-*i*, according to the interlaced-scanning synchronizing signal of the 525i mode. Then the digital output circuit 15 produces an SDI signal for SDI with an external video apparatus from the output signal of the digital processing circuit unit 5, according to the interlaced-scanning synchronizing signal of the 525i mode supplied through the i/p switching circuit 16.

As described. above, the output signal of FIG. 2-*e* (525/60P) of the memory 12 is converted, in the digital output circuit 15, to the standard SDI signal of the 525/60P mode in the mode-1, and, the output signal of FIG. 2-*i* (525/30P) of the memory 12 is converted in the digital output circuit 15 to the standard SDI signal of the 525i mode in the mode-2. In this case, the latter, viz., the interlaced-scanning signal of the 525i mode is originally the progressive-scanning signal of the 525/30P mode.

In this exemplary embodiment, as described above, the process until the writing of the signal into the memory 12 is performed according to the progressive-scanning synchronizing signal, irrespective of the modes of the signals. As a result, the video signals of both 525/60P mode and 525/30P mode can be produced by a circuit having simple structure, by which the improvement from the conventional image pickup apparatus can be realized in regard to the structure and the performance.

In the above, the description on the control of mode information (mode-1, mode-2) is omitted, which, however, can be performed by using a controlling unit such as a microcomputer (not illustrated) or the like.

Second Exemplary Embodiment

Figure 3:
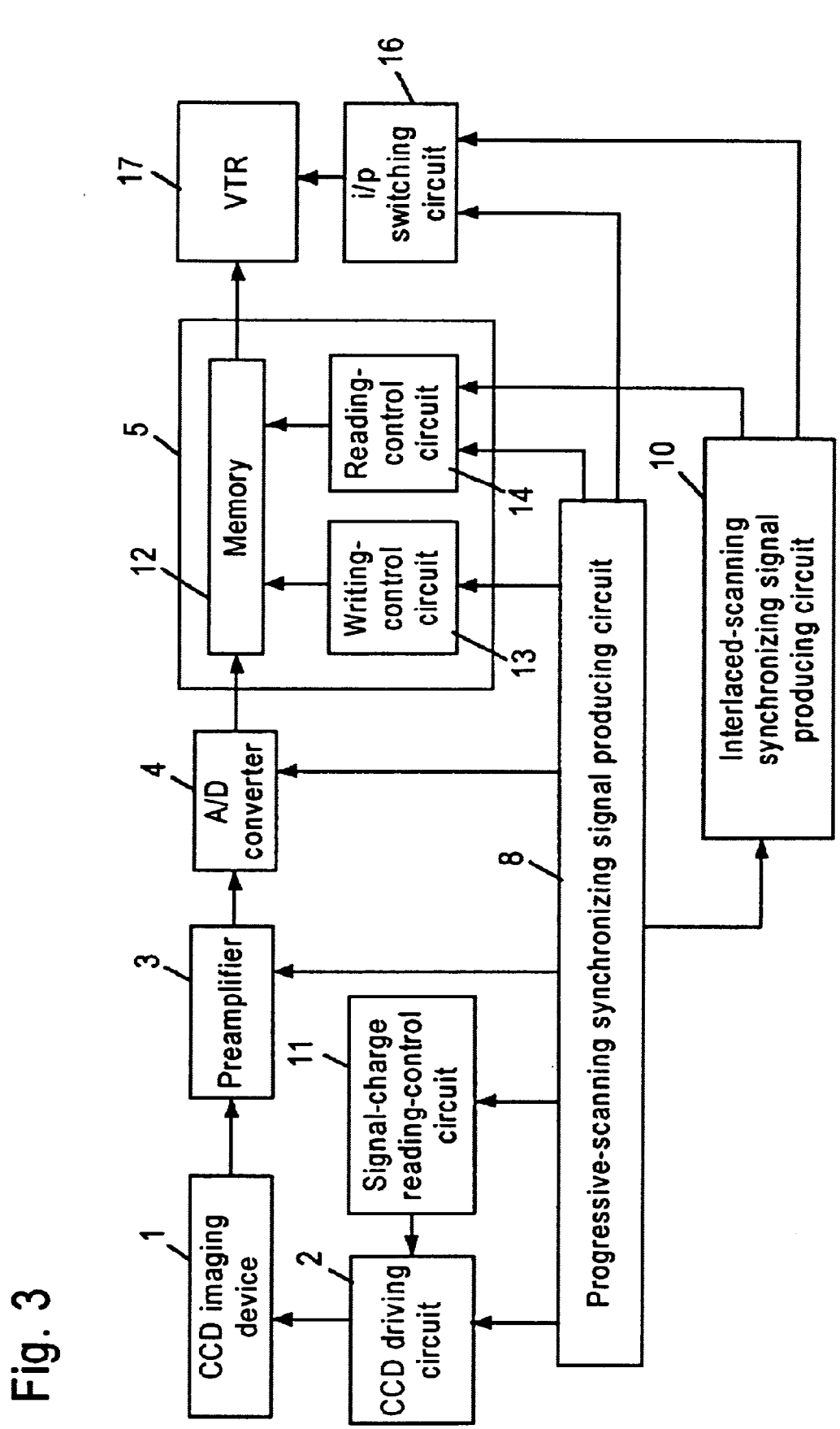
FIG. 3 is a block diagram showing the structure of an image pickup apparatus in a second exemplary embodiment of the same.

FIG. 3 is a block diagram showing the structure of an image pickup apparatus in a second exemplary embodiment of the present invention. The reference numerals in FIG. 3 are identical with those for the corresponding composing members of FIG. 1, and the description on these is omitted. In FIG. 3, the difference from FIG. 1 is that a VTR 17 is disposed in place of the digital output circuit 15. The VTR 17 is a recording unit that can record the signal of the 525/60P mode or the 525i mode, according to the instruction of the i/p switching circuit 16. As a result, the VTR can record the signal of the 525/60P mode in the mode-1, or the signal of the 525/30P mode in the mode-2. In this case, the VTR records the signal of the 525/30P mode, which is not standardized as a studio standard, in the mode converted to the 525i mode that is standardized as a studio standard.

In the above description, a VTR is used for the recording unit. However, the same effect can be obtained by using another recording unit that can record the signal of the 525/60P mode or the 525i mode.

Third Exemplary Embodiment

Figure 4:
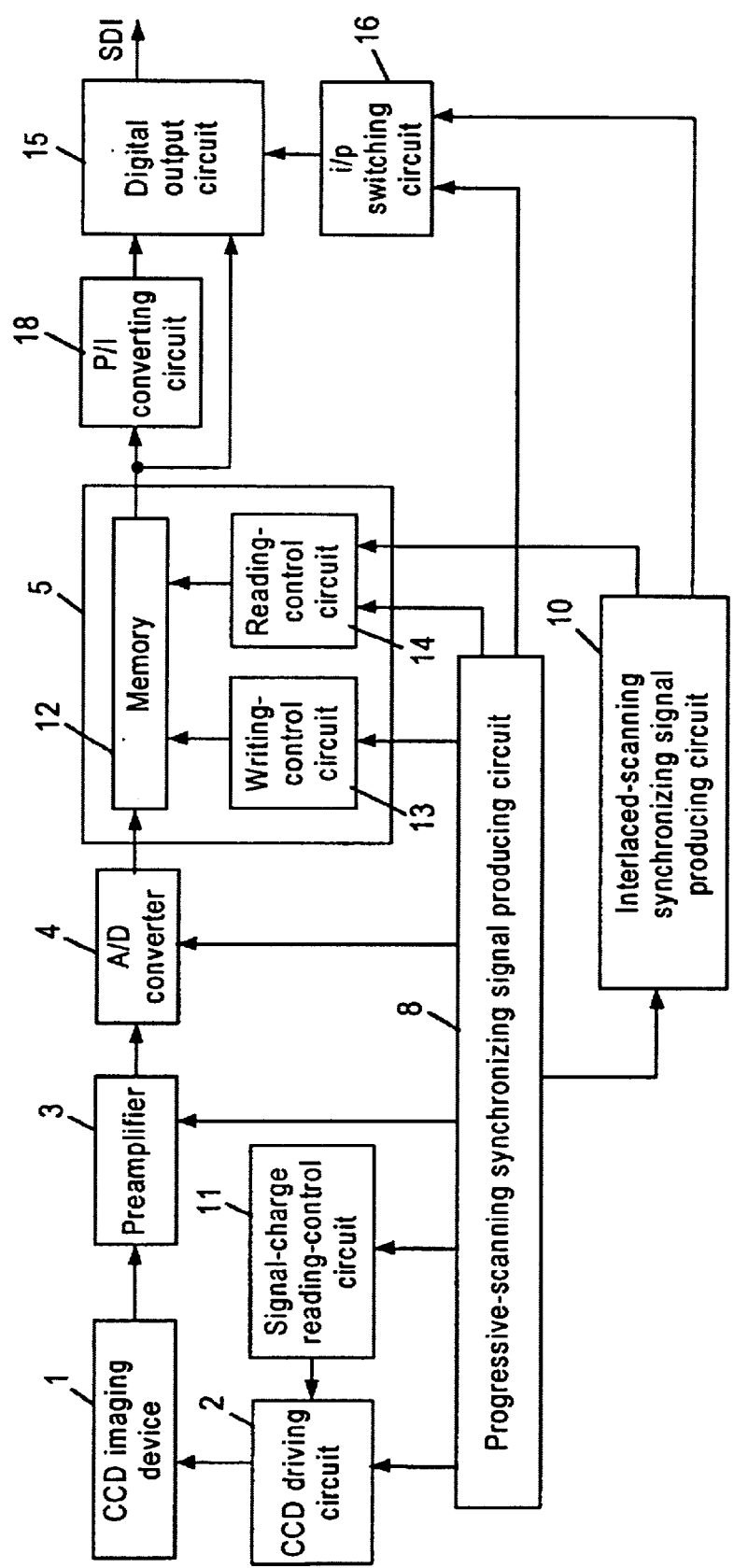
FIG. 4 is a block diagram showing the structure of an image pickup apparatus in a third exemplary embodiment of the same.

FIG. 4 is a block diagram showing the structure of an image pickup apparatus in a third exemplary embodiment of the present invention. In FIG. 4, the difference from FIG. 1 is that a P/I (progressive/interlaced-scanning) converting circuit 18 is added between the output side of the digital processing circuit unit 5 and the input side of the digital output circuit 15. The P/I converting circuit 18 produces an interlaced-scanning signal by adding two lines of the signal of the 525/60P mode, which is read out from the memory 12, alternately decimating the added lines, and expanding the time base of the signal comprising the added lines to double. The other composing members of FIG. 4 are identical with those of FIG. 1, and description on these is omitted.

The processes of adding two lines and expanding the time base are performed by using 1H (one horizontal) memories (a 1H memory is a memory that stores a signal of one horizontal scanning interval). That is to say, the process of adding two lines is performed in the manner of 1+2, 3+4, 5+6,—in each odd field, and, 2+3, 4+5, 6+7,—in each even field, of the interlaced-scanning (the numerals denote the line numbers of the scanning), and, the process of expanding the time base of the signal comprising the added lines to double is performed by changing the horizontal scanning frequency of the signal from 33.5 kHz to 15.75 kHz.

For obtaining the signal of the 525/60P mode or the 525/30P mode, the output signal of the digital processing circuit 5 is directly introduced into the digital output circuit 15 as shown in FIG. 4 in stead of introducing the signal through P/I converting circuit 18.

As described above, by adding the P/I converting circuit 18 to the structure of the first exemplary embodiment, the signal of the 525/60P mode, the 525/30P mode, or the 525i mode can be obtained, i.e., an image pickup apparatus that is usable for the three modes can be thus obtained.

Fourth Exemplary Embodiment

Figure 5:
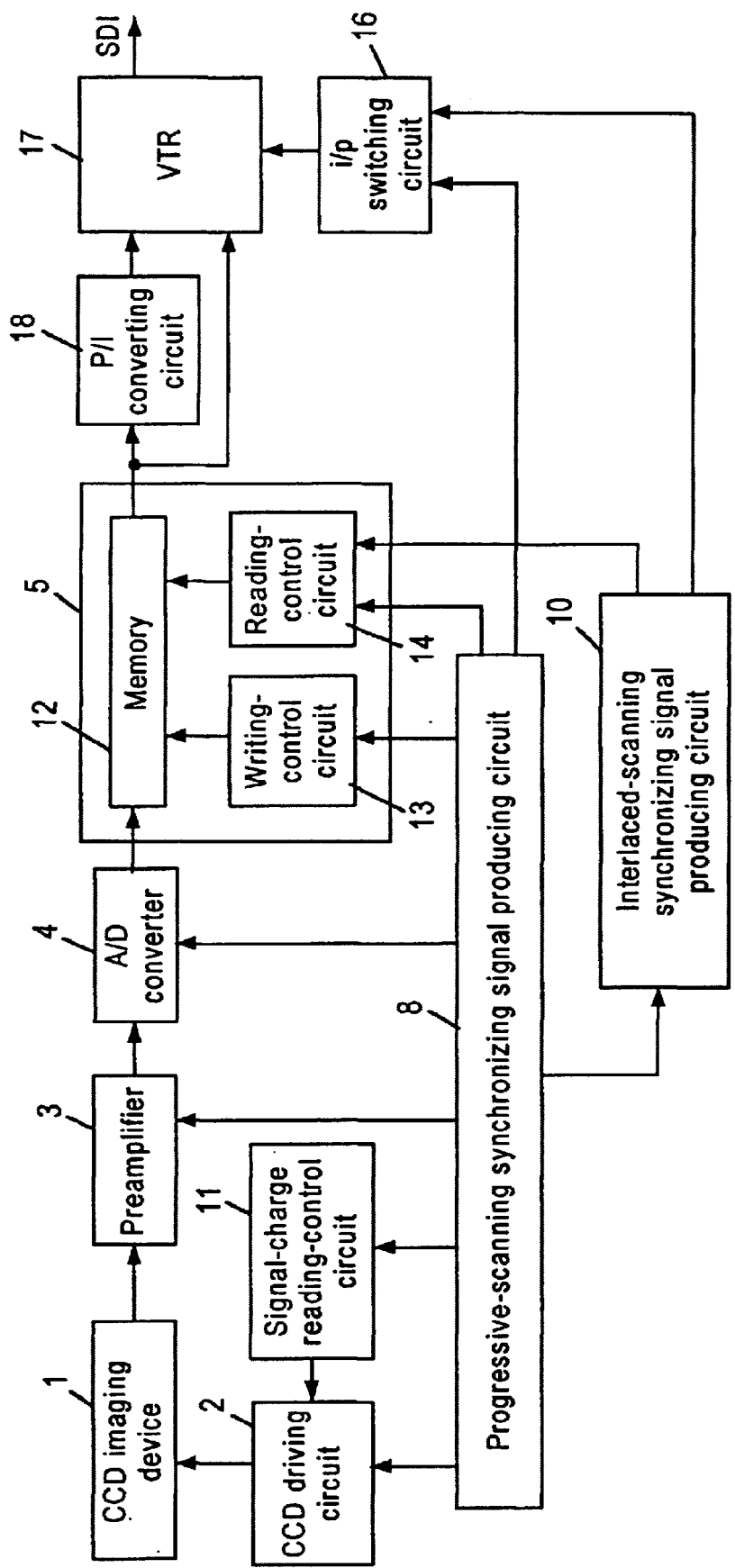
FIG. 5 is a block diagram showing the structure of an image pickup apparatus in a fourth exemplary embodiment of the same.

FIG. 5 is a block diagram showing the structure of an image pickup apparatus of a fourth exemplary embodiment of the present invention. FIG. 5 has the composing members of FIG. 3 of the second exemplary embodiment and those of FIG. 4 of the third exemplary embodiment. Therefore, in this exemplary embodiment, the detailed description on the matters described in the second and the third exemplary embodiments is omitted.

In FIG. 5, the VTR 17 can record the signal of the 525/60P mode or the 525i mode according to the instruction of the i/p switching circuit 16. While, the P/I converting circuit 18 converts the signal of the 525/60P mode to the signal of the 525i mode as described in the third exemplary embodiment. As a result, the VTR can record the signal of the 525/60P mode, the 525/30P mode, or the 525/30i mode. In this case, the VTR records the signal of the 525/30P mode, which is not standardized as a studio standard, in the mode converted to the 525i mode that is standardized as a studio standard.

Fifth Exemplary Embodiment

Figure 6:
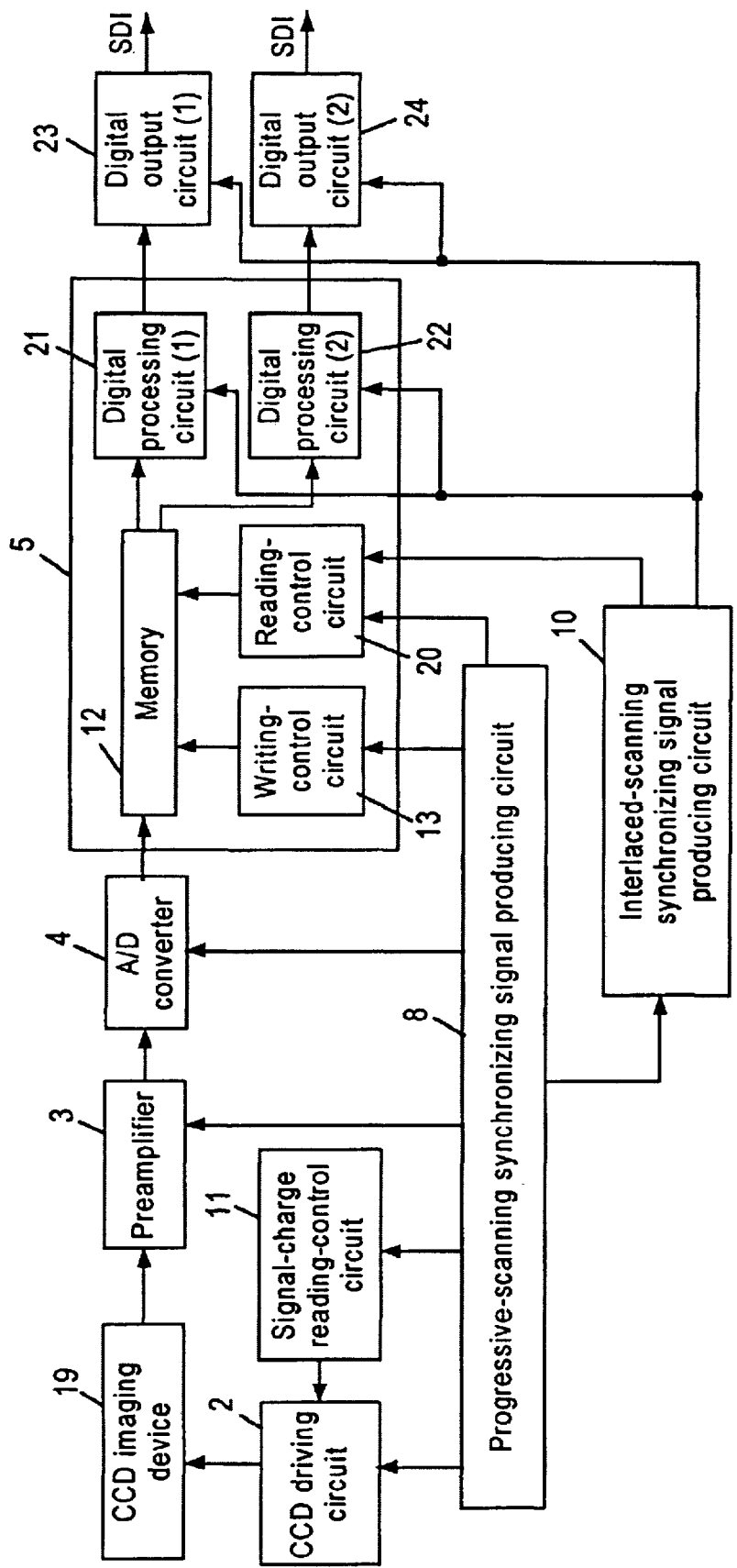
FIG. 6 is a block diagram showing the structure of an image pickup apparatus in a fifth exemplary embodiment of the same, FIG. 7-a through FIG. 7-h show waveforms for explanation on the fifth exemplary embodiment, and FIG. 7-i shows a waveform for explanation on a seventh exemplary embodiment of the same.

FIG. 6 is a block diagram showing the structure of a fifth exemplary embodiment of the present invention. The reference numerals in FIG. 6 are identical with those for the corresponding composing members in FIG. 1, and the description on these is omitted. In FIG. 6, a CCD imaging device 19 is composed in such a manner that the scanning is performed on the CCD imaging device 19 according to the progressive-scanning synchronizing signal, and that the reading of signal-charge that is charged in the CCD imaging device 19 is performed in such a manner that all odd lines are read out in the first half of each field and all even lines are read out in the latter half of each field, or, all even lines are read out in the first half of each field and all odd lines are read out in the latter half of each field. A reading-control circuit 20 works for reading out the progressive-scanning signal written in the memory 12, in the form of two separate interlaced-scanning signals, according to the interlaced-scanning synchronizing signal supplied by the interlaced-scanning synchronizing signal producing circuit 10. Digital processing circuits (1) 21 and (2) 22 perform the video-signal processing on the two separate interlaced scanning signals that are read out from the memory 12. Digital output circuits (1) 23 and (2) 24 produce respective SDI signals from the two separate interlaced-scanning signals received through the digital processing circuits (1) 21 and (2) 22.

Figure 7:
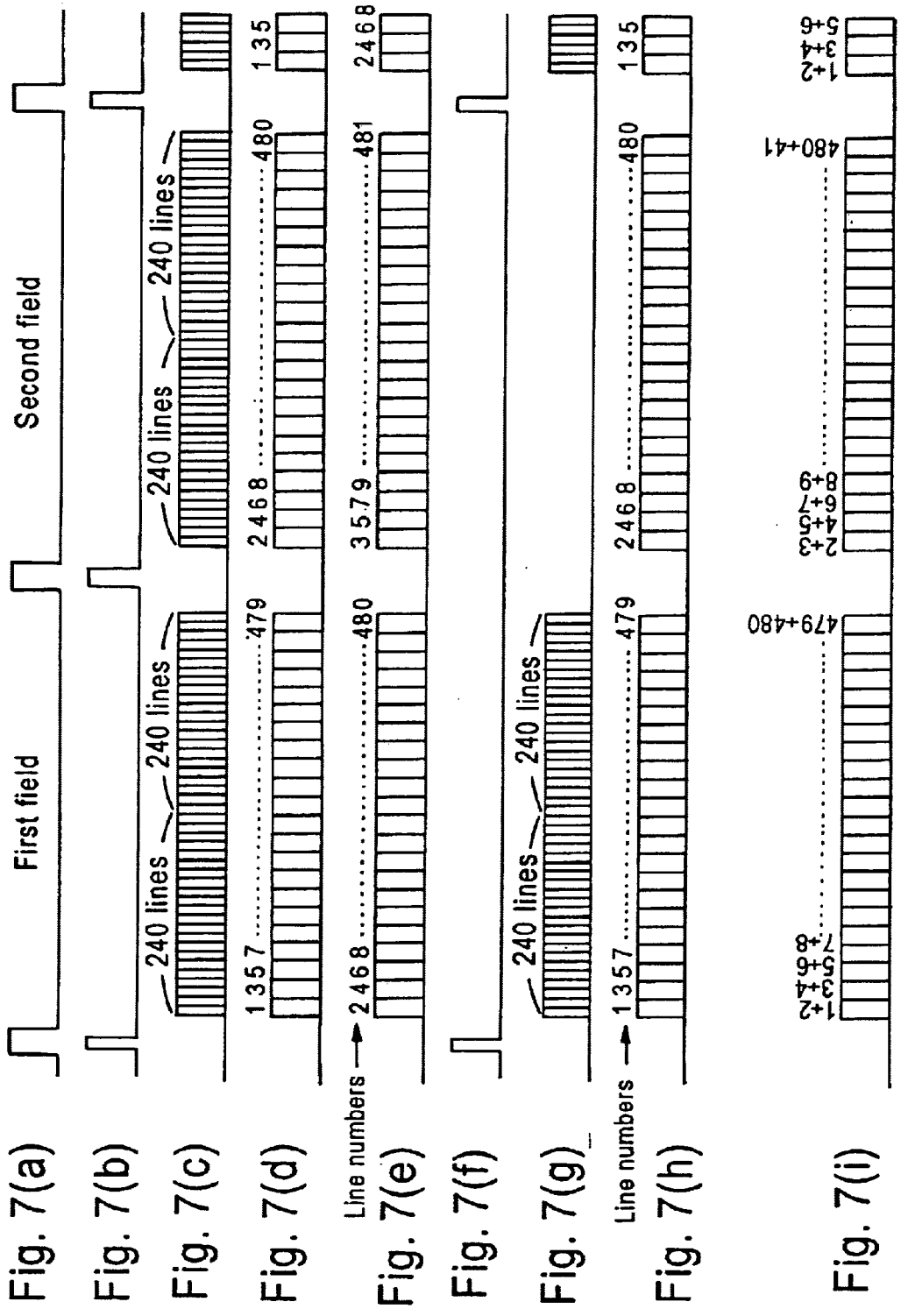

The operation of the image pickup apparatus of the fifth exemplary embodiment is described hereinafter referring to the waveforms shown by FIG. 7-*a* through FIG. 7-*h*. FIG. 7-*a* shows the waveform of the vertical synchronizing signal of the progressive-scanning synchronizing signal of the 525/60P mode and that of the interlaced-scanning synchronizing signal of the 525i mode, i.e., both vertical synchronizing signals have the identical frequency of FIG. 7-*a*.

First, the operation in the mode-1 is described hereinafter. FIG. 7-*b* through 7-*e* show the waveforms in the mode-1 (525/60P). The signal-charge reading pulse of FIG. 7-*b* is supplied from the CCD driving circuit 2 to the CCD imaging device 19 according to the control of the signal-charge reading-control circuit 11, by which the signal-charge that is charged in the CCD imaging device 1 is read out in such a manner that, as shown by the waveform of FIG. 7-*c*, all odd lines (240 lines) are read out in the first half of each field and all even lines (240 lines) are read out in the latter half of each field, or, all even lines are read out in the first half of each field and all odd lines are read out in the latter half of each field.

The signal that is read out from the CCD imaging device 19 is introduced into the preamplifier 3, and, into the A/D converter 4 for analog-to-digital conversion, then, into the memory 12 in which the signal is written. The reading-control circuit 20 works for reading out the progressive-scanning signal written in the memory 12, in the form of two separate interlaced-scanning signals as shown by FIG. 7-*d* and FIG. 7-*e*, according to the interlaced-scanning synchronizing signal supplied by the interlaced-scanning synchronizing signal producing circuit 10.

In more detail, the signal for introducing into the digital processing circuit (1) 21 is read out from the memory 12 in such a manner that odd lines are read out in each odd field, and even lines are read out in each even field as shown by FIG. 7-*d*. On the other hand, the signal for introducing into the digital processing circuit (2) 22 is read out from the memory 12 in such a manner that even lines are read out in each odd field and odd lines are read out in each even field as shown by FIG. 7-*e*.

Then the two interlaced-scanning signals obtained from the memory 12 undergo the video-signal processing of the digital processing circuits (1) 21 and (2) 22 respectively. Then these signals are converted to respective SDI signals by the digital output circuits (1) 23 and (2) 24 which are the circuits for performing the processing of interlaced-scanning signals. As a result, an SDI signal comprising two SDI signals, which corresponds to the progressive-scanning SDI signal of the studio standard of 4:2:2p of BTA T1004, can be obtained.

Next, the operation of the mode-2 is described hereinafter. FIG. 7-*f* through FIG. 7-*h* show waveforms in the mode-2 (525/30P). The signal-charge reading pulse shown by FIG. 7-*f* is supplied from the CCD driving circuit 2 to the CCD imaging device 19 once in every two fields according to the control of the signal-charge reading-control circuit 11, for reading out the signal-charge that is charged in the CCD imaging device 19. As a result, the signal-charge is read out once (viz., during one field) in every two fields. The reading of the signal-charge is performed in such a manner, as shown by FIG. 7-*g*, that all odd lines (240 lines) are read out in the first half of each field and all even lines (240 lines) are read out in the latter half of each field, or, all even lines are read out in the first half of each field and all odd lines are read out in the latter half of each field.

Then, the signal that is read out from the CCD imaging device is introduced into the preamplifier 3, and, into the A/D converter 4 for analog-to-digital conversion, then, into the memory 12 in which the signal is written. The reading-control circuit 20 works for reading out the progressive-scanning signal written in the memory 12, in the form of one interlaced-scanning signal as shown by FIG. 7-*h*, according to the interlaced-scanning synchronizing signal supplied by the interlaced-scanning synchronizing signal producing circuit 10. That is to say, the signal obtained from the CCD imaging device 19 in one field of progressive scanning covers the two fields of the interlaced-scanning signal. In this case, as shown by FIG. 7-*h*, odd lines are read out in each odd field and even lines are read out in each even field, from the memory 12.

As described above, in the mode-2, the signal of the 525/30P mode, which is a progressive-scanning signal, is converted to one interlaced-scanning signal in the memory 12. Then, the signal is converted to the studio standard SDI signal (SMPTE259M) of the 525i mode after undergoing the processing of the digital processing circuit (1) 21 and the digital output circuit (1) 23. Then the SDI signal is sent out to an external video apparatus.

For the CCD imaging device 19 in this exemplary embodiment, the imaging device of "⅔-inch 520000-pixel 16:9 imaging sensor" reported in Vol. 17, No. 16, March, 1993 of the Journal of the Japanese Television Association is used as a representing one because the CCD imaging device of this type has good performance. In this exemplary embodiment, a memory is needed for converting the progressive-scanning signal of FIG. 7-*c* to the two interlaced-scanning signals of FIG. 7-*d* and FIG. 7-*e*. However, the same memory can be used for converting the progressive-scanning signal of the 525/30P mode of FIG. 7-*g* to one interlaced-scanning signal of the 525i mode of FIG. 7-*h*.

The above structure of this exemplary embodiment has advantage that both digital processing circuits and digital output circuits for converting to SDI signals are those used for interlaced-scanning that is most popular.

Sixth Exemplary Embodiment

Figure 8:
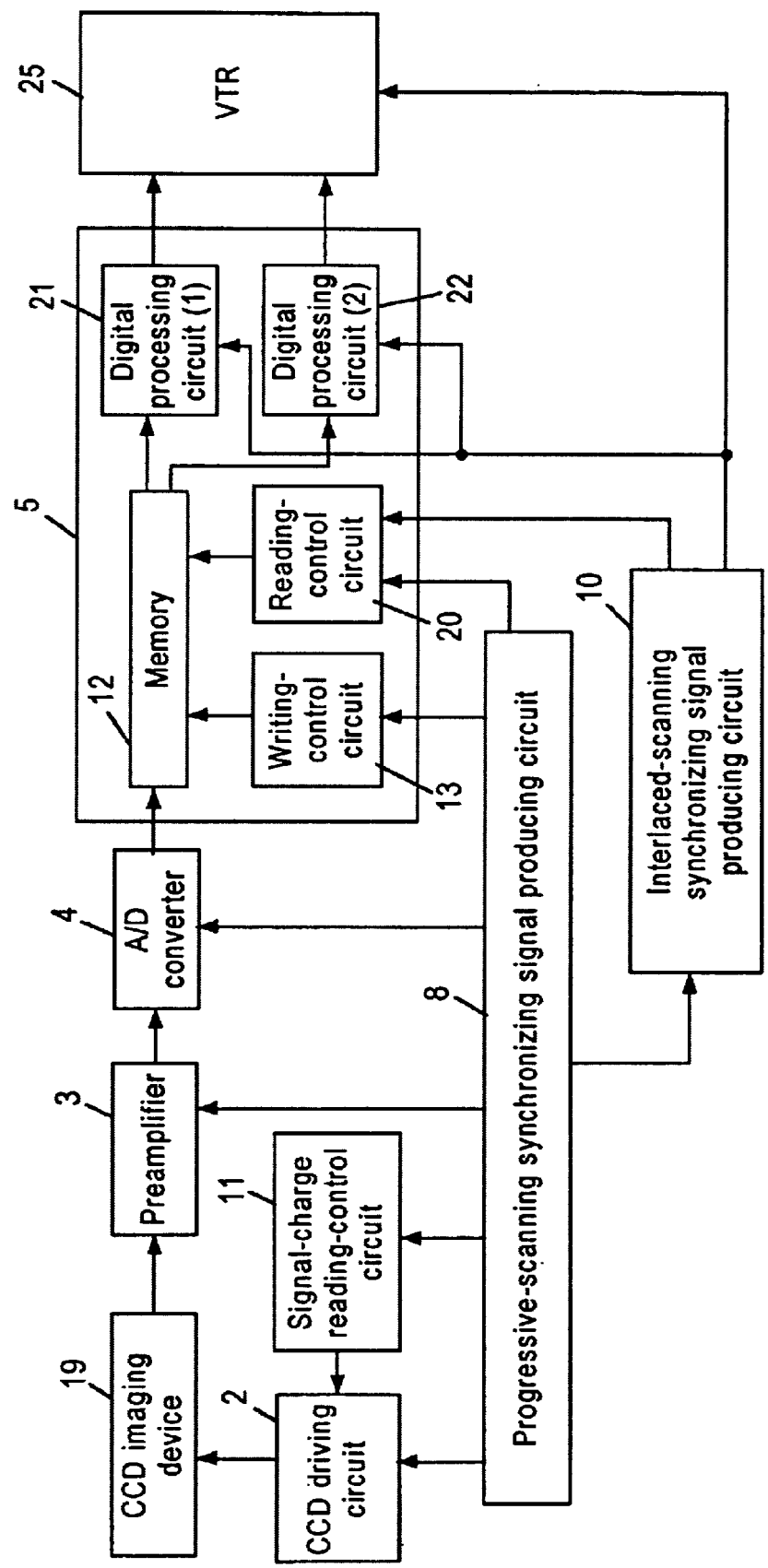
FIG. 8 is a block diagram showing the structure of an image pickup apparatus in a sixth exemplary embodiment of the same.

FIG. 8 is a block diagram showing the structure of an image pickup apparatus in a sixth exemplary embodiment of the present invention. The reference numerals in FIG. 8 are identical with those for the corresponding composing members in FIG. 6, and the description on these is omitted.

As shown in FIG. 8, a VTR 25 is disposed in place of the digital output circuits (1) 23 and (2) 24. The VTR 25 can record the signal of the 525/60P mode or the 525i mode. As a result, the VTR can record the signal of the 525/60P mode by recording the two interlaced-scanning signals that are produced in the mode-1, or the signal of the 525/30P mode by recording one interlaced-scanning signal that is produced in the mode-2, as described in the fifth exemplary embodiment. That is to say, the VTR records the signal of the 525/30P mode, which is not standardized as a studio standard, in the mode converted to the 525i mode.

Seventh Exemplary Embodiment

Figure 9:
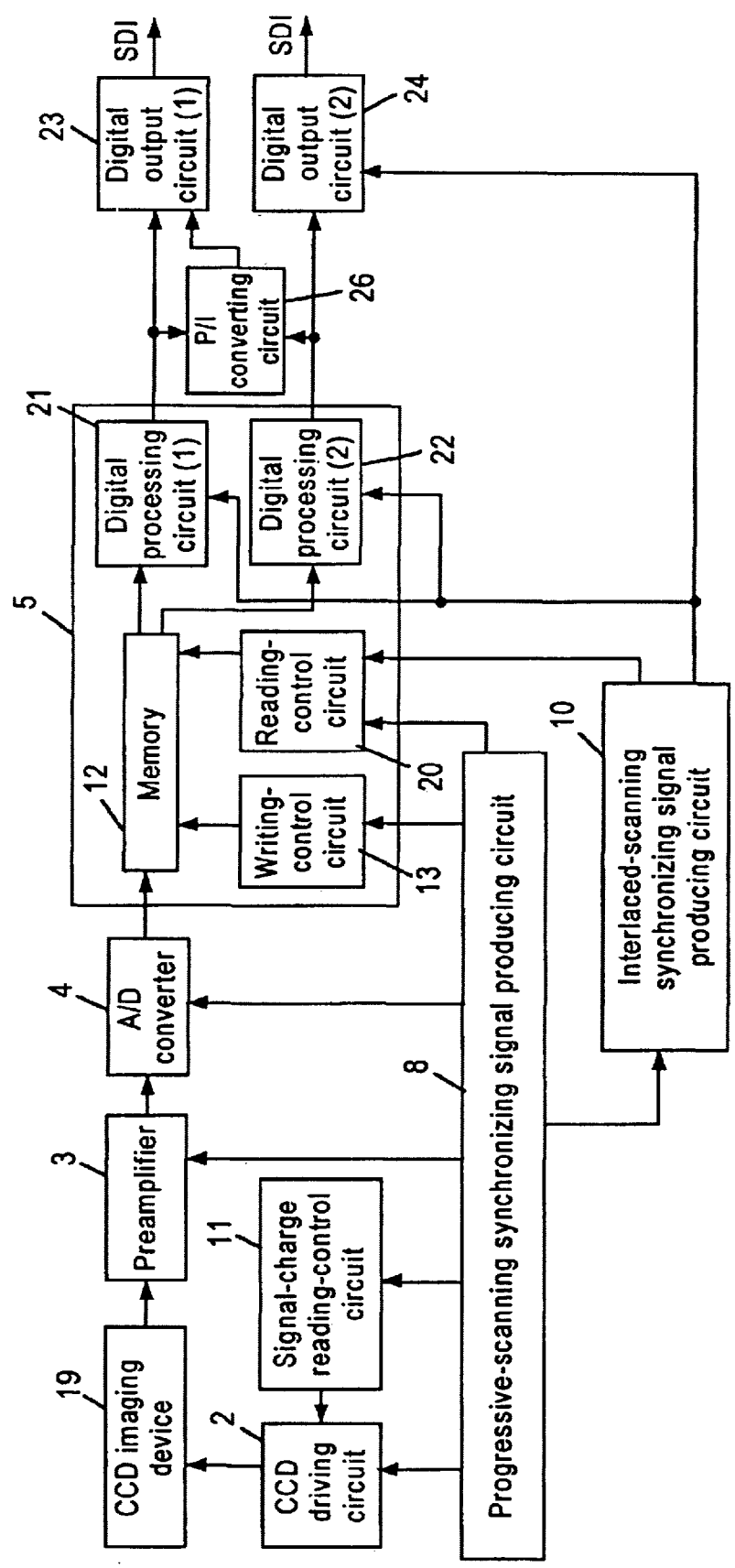
FIG. 9 is a block diagram showing the structure of an image pickup apparatus in a seventh exemplary embodiment of the same.

FIG. 9 is a block diagram showing the structure of an image pickup apparatus in a seventh exemplary embodiment of the present invention. The reference numerals in FIG. 9 are identical with those for the corresponding composing members in FIG. 6, and the description on these is omitted.

In FIG. 9, the difference from FIG. 6 is that a P/I converting circuit 26 is connected to the output sides of the digital processing circuits (1) 21 and (2) 22, and to the input side of the digital output circuits (1) 23 as shown in FIG. 9. The P/I converting circuit 26 produces one interlaced-scanning signal from two separate interlaced-scanning signals obtained in the mode-1 as described in the fifth exemplary embodiment. In more detail, the signal of the 525i mode as shown by FIG. 7-*i* is produced by the P/I converting circuit 26 by adding two signals respectively having the structure of FIG. 7-*d* and FIG. 7-*e*, which are obtained from the memory 12 through the digital processing circuits (1) 21 and (2) 22 where the video-signal processing is performed. The process of adding the two signals is performed in such a manner that the pairs of odd lines and even lines are added in the manner of 1+2, 3+4,—in each odd field, and, the pairs of even lines and odd lines are added in the manner of 2+3, 4+5,—in each even field, as shown by FIG. 7-*i*. Then the signal of the 525i mode thus obtained is converted to the standard SDI signal of the 525i mode by the digital output circuit (1) 23.

As a result, three studio standard SDI signals can be obtained in this exemplary embodiment, i.e., in addition to the two SDI signals produced based on the signals of the 525/60P mode and the 525/30P mode, which are obtained in the same manner as in the fifth exemplary embodiment, the above SDI signal of the 525i mode is also obtained.

Although the output signal of the digital processing circuit (1) 21 in the operation of the 525/60P mode have the form of the 525i mode, the signal can not be used as the signal of the 525i mode as it is, because the signal has too much high frequency components in vertical frequency characteristic, which causes too much line-flickers that worsen the picture quality to the unacceptable level. Therefore, the above P/I converting circuit is used for optimizing the vertical frequency characteristics, by which the signal of the 525i mode having few line-flickers can be obtained.

In this exemplary embodiment, as described above, the P/I converting circuit 26 has the structure for only adding the two separate interlaced-scanning signals.

Eighth Exemplary Embodiment

Figure 10:
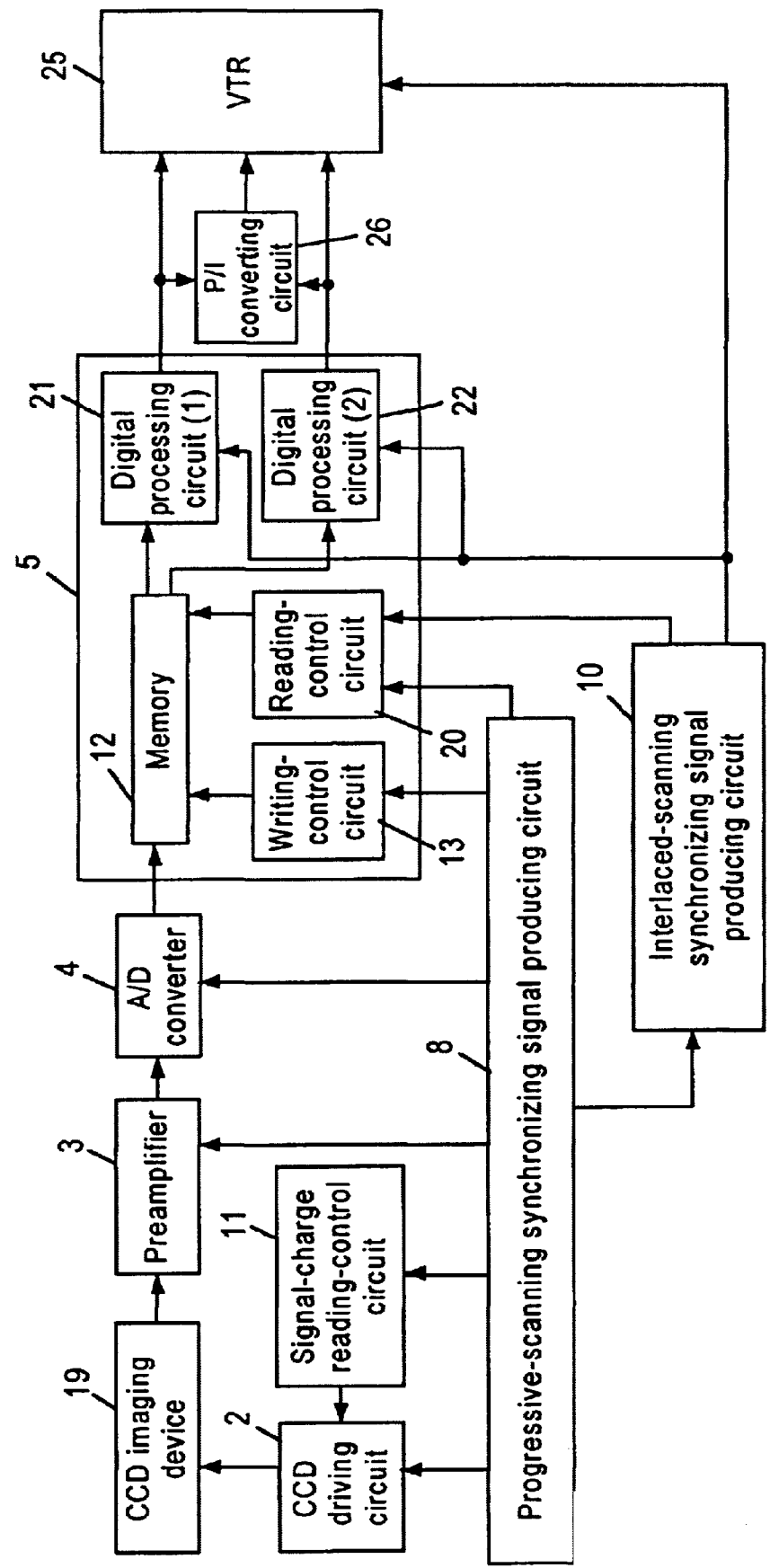
FIG. 10 is a block diagram showing the structure of an image pickup apparatus in a eighth exemplary embodiment of the same.
Figure 11:
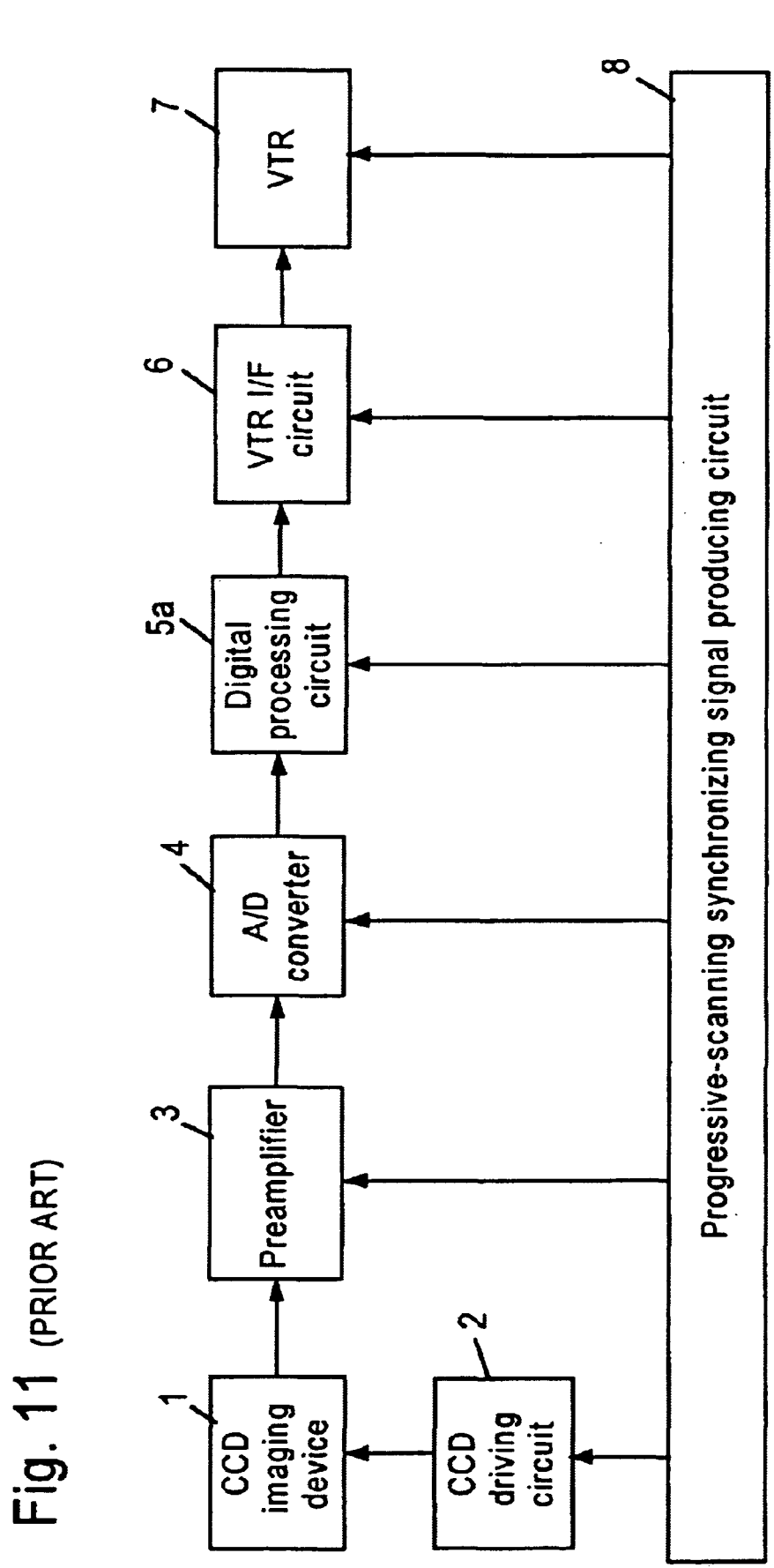
FIG. 11 is a block diagram showing the structure of a conventional image pickup apparatus.

FIG. 10 is a block diagram showing the structure of an image pickup apparatus in a eighth exemplary embodiment of the present invention. The reference numerals in FIG. 10 are identical with those for the corresponding composing members in FIG. 6, 8 or 9, and the description on these is omitted.

Also, the structure and the function of the P/I converting circuit 26 of this exemplary embodiment are identical with those of the P/I converting circuit 26 in the seventh exemplary embodiment, and, the structure and the function of the VTR 25 of this exemplary embodiment are identical with those of the VTR 25 of sixth exemplary embodiment.

As a result, the VTR 25, which can record the signal of the 525/60P mode or the 525i mode as described in the sixth exemplary embodiment, can record the signal of the 525/60P mode, the 525/30P mode, or the 525i mode, which is obtained in the same manner as in the seventh exemplary embodiment.

In the above description, a VTR is used for the recording unit. However, the same effect can be obtained by using another recording unit that can record these video signals.

As described above, in the present invention, the pulses for driving all of the composing members including the preamplifier are common for all of the composing members irrespective of the signal mode of the 525/60P mode, the 525/30P mode, or the 525i mode except the pulse for reading out the signal-charge that is charged in the CCD imaging device. As a result, the circuits for driving the CCD and for the preamplifier can be simplified, and, the number of filters disposed before the analog-to-digital conversion for decreasing the influence of pulses for CCD driving and for noise reduction can be decreased, which serve for optimizing the CCD imaging device. The image pickup apparatus that has good performance and is usable for the three modes of the 525/60P mode, the 525/30P mode, and the 525i mode is thus obtained.

What is claimed is:

1. An image pickup apparatus comprising:

(a) a solid imaging device;

(b) a progressive-scanning synchronizing signal producing circuit for supplying a progressive-scanning synchronizing signal;

(c) an interlaced-scanning synchronizing signal producing circuit for supplying an interlaced-scanning synchronizing signal having a vertical synchronizing signal of the frequency that is identical with the frequency of the vertical synchronizing signal of said progressive-scanning synchronizing signal, and a horizontal synchronizing signal of the frequency that is substantially the half of the frequency of the horizontal synchronizing signal of said progressive-scanning synchronizing signal;

(d) an imaging-device driving circuit for supplying a driving signal that performs scanning on said solid imaging device according to said progressive-scanning synchronizing signal;

(e) a signal-charge reading-control circuit for switching to one of the following two modes; mode-1 in which one reading pulse is supplied in each vertical scanning interval of progressive-scanning, and mode-2 in which one reading pulse is supplied in every two vertical scanning intervals of progressive-scanning, for reading out signal-charge that is charged in said solid imaging device as the output signal of said solid imaging device, wherein said reading pulse is included in said driving signal supplied by said imaging-device driving circuit;

(f) a memory into which said output signal of said solid imaging device is written;

(g) a writing-control circuit that works for writing, into said memory, said output signal of said solid imaging device, during the interval when said output signal is obtained by reading out the signal-charge that is charged in said solid imaging device; and (h) a reading-control circuit that works for reading out, in said mode-1, the signal written in said memory as the output signal of said memory according to said progressive-scanning synchronizing signal, and, for reading out, in said mode-2, the signal written in said memory as the output signal of said memory in such a manner that odd lines are read out in each odd field and even lines are read out in each even field according to said interlaced-scanning synchronizing signal.

2. The image pickup apparatus according to claim 1, further comprising a recording unit that performs one of the following recordings: the recording of said output signal of said memory according to said progressive-scanning synchronizing signal in said mode-1, and, the recording of said output signal of said memory according to said interlaced-scanning synchronizing signal in said mode-2.

3. The image pickup apparatus according to claim 1, further comprising a P/I converting circuit that produces, in said mode-1, an interlaced-scanning signal, as the output signal of the P/I converting circuit, by adding two lines of said output signal of said memory, alternately decimating said added lines, and expanding the time base of the signal comprising said added lines to double.

4. The image pickup apparatus according to claim 3, further comprising a recording unit that records one of the following signals:

(a) said output signal of said memory in said mode-1, wherein said output signal synchronizes with said progressive-scanning synchronizing signal, (b) said output signal of said memory in said mode-2, wherein said output signal synchronizes with said interlaced-scanning synchronizing signal, and (c) said output signal of said P/I converting circuit.

5. An image pickup apparatus comprising:

(a) a progressive-scanning synchronizing signal producing circuit for supplying a progressive-scanning synchronizing signal;

(b) an interlaced-scanning synchronizing signal producing circuit for supplying an interlaced-scanning synchronizing signal having a vertical synchronizing signal of the frequency that is identical with the frequency of the vertical synchronizing signal of said progressive-scanning synchronizing signal, and a horizontal synchronizing signal of the frequency that is substantially the half of the frequency of the horizontal synchronizing signal of said progressive-scanning synchronizing signal;

(c) a solid imaging device that is composed in such a manner that scanning is performed on said solid imaging device according to said progressive-scanning synchronizing signal, and the reading of signal-charge that is charged in said solid imaging device is performed in one of the following manners:

(c-1) a manner in which all odd lines are read out in the first half of each vertical scanning interval and all even lines are read out in the latter half of each vertical scanning interval, and (c-2) a manner in which all even lines are read out in the first half of each vertical scanning interval and all odd lines are read out in the latter half of each vertical scanning interval;

(d) an imaging-device driving circuit for supplying a driving signal that performs scanning on said solid imaging device according to said progressive-scanning synchronizing signal;

(e) a signal-charge reading-control circuit for switching to one of the following two modes, mode-1 in which one reading pulse is supplied in each vertical scanning interval of progressive-scanning, and mode-2 in which one reading pulse is supplied in every two vertical scanning intervals of progressive scanning, for reading out signal-charge that is charged in said solid imaging device as the output signal of said solid imaging device, wherein said reading pulse is included in said driving signal supplied by said imaging-device driving circuit;

(f) a memory into which said output signal of said solid imaging device is written;

(g) a writing-control circuit that works for writing, into said memory, said output signal of said solid imaging device, during the interval when said output signal is obtained by reading out the signal-charge that is charged in said solid imaging device; and (h) a reading-control circuit that works for reading out the signal written in said memory according to said interlaced-scanning synchronizing signal in one of the following forms, in the form of two separate interlaced-scanning signals in said mode-1, and in the form of one interlaced-scanning signal in said mode-2.

6. The image pickup apparatus according to claim 5, further comprising a recording unit that performs one of the following recordings, the recording of said two separate interlaced-scanning signals that are read out from said memory in said mode-1, and, the recording of said one interlaced-scanning signal that is read out from said memory in said mode-2.

7. The image pickup apparatus according to claim 5, further comprising a P/I converting circuit for producing, as the output signal of said P/I converting circuit, one interlaced-scanning signal by adding the corresponding two lines of said two separate interlaced-scanning signals that are read out from said memory in said mode-1.

8. The image pickup apparatus according to claim 7, further comprising a recording unit that records one of the following signals:

(a) said two interlaced-scanning signals that are read out from said memory in said mode-1, (b) said one interlaced-scanning signal that is read out from said memory in said mode-2, and (c) said output signal of said P/I converting circuit.

* * * * *